US012669977B2

(12) United States Patent
Kim et al.

(10) Patent No.: US 12,669,977 B2
(45) Date of Patent: Jun. 30, 2026

(54) ELECTRONIC DEVICE AND OPERATING METHOD THEREOF

(71) Applicant: LG ELECTRONICS INC., Seoul (KR)

(72) Inventors: Tae Young Kim, Seoul (KR); Tae Jin Park, Seoul (KR); Hyung Woo Park, Seoul (KR); Sang Hun Kim, Seoul (KR); Eun Jung Lee, Seoul (KR); Hyo Jeong Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 272 days.

(21) Appl. No.: 18/521,679

(22) Filed: Nov. 28, 2023

(65) Prior Publication Data

US 2024/0411509 A1 Dec. 12, 2024

(30) Foreign Application Priority Data

Jun. 9, 2023 (KR) ........................ 10-2023-0074523

(51) Int. Cl.
*G06F 3/16* (2006.01)
*H04S 7/00* (2006.01)

(52) U.S. Cl.
CPC .............. *G06F 3/165* (2013.01); *G06F 3/162* (2013.01); *H04S 7/30* (2013.01)

(58) Field of Classification Search
CPC . G06F 3/165; G06F 3/162; H04S 7/30; H04S 7/301; H04S 2400/05; H04R 5/04; H04R 2420/07; H04R 2499/15
See application file for complete search history.

(56) References Cited

U.S. PATENT DOCUMENTS 9,219,959 B2 12/2015 Kallai et al.
2009/0147134 A1 6/2009 Iwamatsu
2019/0281403 A1 9/2019 Moller
2021/0176562 A1 6/2021 Curtis et al.
2022/0150654 A1* 5/2022 Lee .......................... H04R 5/02
(Continued)

FOREIGN PATENT DOCUMENTS

EP 4024902 7/2022
JP 2004-328519 11/2004
JP 2015-039081 2/2015
(Continued)

OTHER PUBLICATIONS

Korean Intellectual Property Office Application No. 10-2023-0074523, Office Action dated Jul. 31, 2024, 5 pages.
(Continued)

*Primary Examiner* — David L Ton
(74) *Attorney, Agent, or Firm* — LEE, HONG, DEGERMAN, KANG & WAIMEY

(57) ABSTRACT

An electronic device according to an embodiment of the present disclosure may comprise a speaker, a wireless communication interface configured to communicate with an external speaker and a controller configured to acquire a first output information of the speaker and a second output information of the external speaker, and based on the first output information and the second output information, output a first audio signal to the speaker and transmit a second audio signal to the external speaker through the wireless communication interface.

20 Claims, 15 Drawing Sheets

(56) References Cited

U.S. PATENT DOCUMENTS

| | | | | |
|---|---|---|---|---|
| 2022/0295206 | A1* | 9/2022 | Park | H04S 7/301 |
| 2025/0203289 | A1* | 6/2025 | Kim | H04S 3/008 |

FOREIGN PATENT DOCUMENTS

| | | |
|---|---|---|
| KR | 10-2016-0147556 | 12/2016 |
| KR | 1020170022415 | 3/2017 |
| KR | 10-2020-0122165 | 10/2020 |
| KR | 10-2022-0021218 | 2/2022 |

OTHER PUBLICATIONS

European Patent Office Application Serial No. 24179174.8, Search Report dated Oct. 29, 2024, 10 pages.

* cited by examiner

S305 acquire the output order of the first audio
and the second audio — S601 compare a first average output level of the
first audio and a second average output
level of the second audio for a predetermined time — S603 determine the main speaker and the sub speaker
based on comparison result — S605

S307

ELECTRONIC DEVICE AND OPERATING METHOD THEREOF

CROSS-REFERENCE TO RELATED APPLICATION

Pursuant to 35 U.S.C. § 119, this application claims the benefit of earlier filing date and right of priority to Korean Application No. 10-2023-0074523, filed on Jun. 9, 2023, the contents of which are all incorporated by reference herein in their entirety.

TECHNICAL FIELD

The present disclosure relates to electronic device.

BACKGROUND ART

A digital TV service using a wired or wireless communication network is becoming common. The digital TV service can provide various service that could not be provided in the existing analog broadcasting service.

For example, IPTV (Internet Protocol Television), a type of digital TV service, and smart TV service provide bidirectionality that allows users to actively select the type of program to watch and the viewing time. IPTV and smart TV services may provide various additional service, such as Internet search, home shopping, and online games, based on this interactive nature.

Recently, in order to enhance the sound field, user listen to audio through a built-in speaker in a TV and an external speaker.

However, conventionally, since a speaker built into a TV always outputs main audio and an external device connected to the TV plays a role of outputting sub audio, there is a problem in that optimal sound is not provided.

That is, in the related art, there is a problem in that the role of each speaker is limited regardless of output information or characteristic information of a speaker built into a TV and an external device.

DISCLOSURE

Technical Problem

An object of the present disclosure is to improve sound by selecting a main speaker and a sub speaker according to information about each speaker if audio is output through a speaker built into an electronic device and an external speaker.

An object of the present disclosure is to provide optimal sound quality by controlling audio to be delivered to each speaker or selecting a role of each speaker based on audio outputs of a speaker built into an electronic device and an external speaker, respectively.

Technical Solution

According to an embodiment of the present disclosure, an electronic device may comprise a speaker, a wireless communication interface configured to communicate with an external speaker and a controller configured to acquire a first output information of the speaker and a second output information of the external speaker, and based on the first output information and the second output information, output a first audio signal to the speaker and transmit a second audio signal to the external speaker through the wireless communication interface.

According to an embodiment of the present disclosure, an operating method of an electronic device may comprise: acquiring a first output information of the speaker and a second output information of an external speaker; and based on the first output information and the second output information, outputting a first audio signal to the speaker and transmitting a second audio signal to the external speaker.

Advantageous Effects

According to an embodiment of the present disclosure, if audio is output through a speaker built into an electronic device and an external device, optimal sound quality is provided, so that the user's listening satisfaction can be improved.

According to an embodiment of the present disclosure, the roles of the speaker of the electronic device and the external speaker are automatically set without a user's separate manipulation, so that optimal sound can be provided.

BEST MODE

Hereinafter, embodiments relating to the present disclosure will be described in detail with reference to the drawings. The suffixes "module" and "unit" for components used in the description below are assigned or mixed in consideration of easiness in writing the specification and do not have distinctive meanings or roles by themselves.

Hereinafter, embodiments related to the present invention will be described in more detail with reference to the drawings. The suffixes "module" and "unit" for components used in the following description are given or used together in consideration of ease of writing the specification, and do not have meanings or roles that are distinct from each other by themselves.

An electronic device according to an embodiment of the present invention is, for example, an intelligent electronic device in which a computer support function is added to a broadcast reception function, and an Internet function is added while being faithful to the broadcast reception function, such as a handwriting input device, a touch screen, and the like. Alternatively, a more user-friendly interface such as a space remote control may be provided. In addition, by being connected to the Internet and a computer by supporting a wired or wireless Internet function, functions such as e-mail, web browsing, banking, or game can be performed. A standardized universal OS can be used for these various functions.

Accordingly, since various applications can be freely added or deleted in the electronic device described in the present invention, for example, on a general-purpose OS kernel, various user-friendly functions can be performed. More specifically, the electronic device may be, for example, a network TV, HBBTV, smart TV, LED TV, OLED TV, and the like, and may also be applied to a smartphone in some cases.

Figure 1:
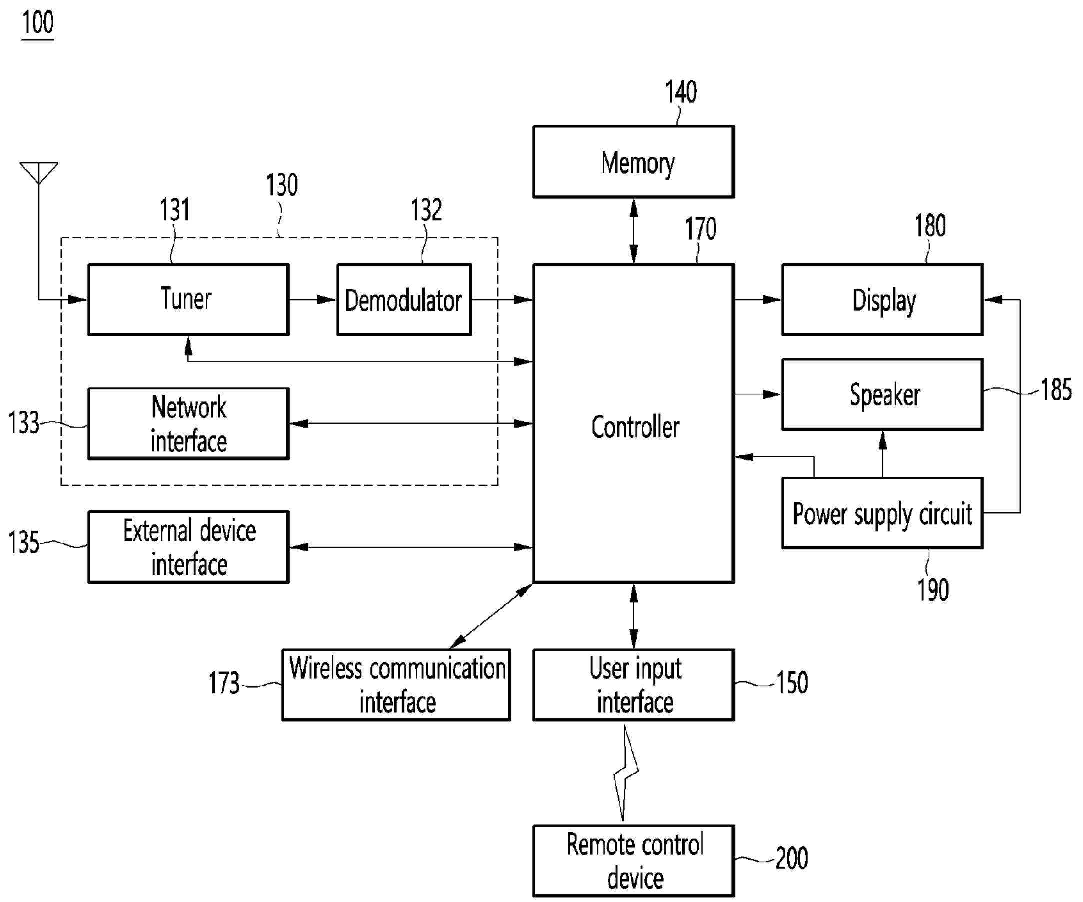
FIG. 1 is a block diagram illustrating the configuration of an electronic device according to an embodiment of the present invention.

FIG. 1 is a block diagram illustrating the configuration of an electronic device according to an embodiment of the present invention.

Referring to FIG. 1, the electronic device 100 may include a broadcast receiver 130, an external device interface 135, a memory 140, a user input interface 150, a controller 170, a wireless communication interface 173, and a display 180, a speaker 185, and a power supply circuit 190.

The broadcast receiver 130 may include a tuner 131, a demodulator 132 and a network interface 133.

The tuner 131 may select a specific broadcasting channel according to a channel selection command. The tuner 131 may receive a broadcast signal for a selected specific broadcast channel.

The demodulator 132 may separate the received broadcast signal into a video signal, an audio signal, and a data signal related to a broadcast program, and restore the separated video signal, audio signal, and data signal into a form capable of being output.

The external device interface 135 may receive an application or an application list in an adjacent external device and transmit the received application to the controller 170 or the memory 140.

The external device interface 135 may provide a connection path between the electronic device 100 and the external device. The external device interface 135 may receive at least one of video and audio output from an external device connected to the electronic device 100 by wire or wirelessly, and transmit the received image to the controller 170. The external device interface 135 may include a plurality of external input terminals. The plurality of external input terminals may include an RGB terminal, one or more High Definition Multimedia Interface (HDMI) terminals, and component terminals.

An image signal of an external device input through the external device interface 135 may be output through the display 180. A voice signal of an external device input through the external device interface 135 may be output through the speaker 185.

An external device connectable to the external device interface 135 may be any one of a set-top box, a Blu-ray player, a DVD player, a game machine, a sound bar, a smart phone, a PC, a USB memory, and a home theater, but this is only an example.

The network interface 133 may provide an interface for connecting the electronic device 100 to a wired/wireless network including an Internet network. The network interface 133 may transmit or receive data with other users or other electronic devices through a connected network or another network linked to the connected network.

In addition, some content data stored in the electronic device 100 may be transmitted to another user pre-registered in the electronic device 100 or a user selected from among other electronic devices or a selected electronic device.

The network interface 133 may access a predetermined web page through a connected network or another network linked to the connected network. That is, by accessing a predetermined web page through a network, data can be transmitted or received with a corresponding server.

Also, the network interface 133 may receive content or data provided by a content provider or network operator. That is, the network interface 133 may receive content and related information such as movie, advertisement, game, VOD, and broadcast signal provided from content provider or network provider through a network.

In addition, the network interface 133 may receive firmware update information and an update file provided by a network operator, and may transmit data to the Internet or a content provider or network operator.

The network interface 133 may select and receive a desired application among applications open to the public through a network.

The memory 140 may store programs for processing and controlling each signal in the controller 170, and may store signal-processed video, audio, or data signals.

In addition, the memory 140 may perform a function for temporarily storing video, audio, or data signal input from the external device interface 135 or the network interface 133, and information related to a predetermined image can also be stored through a channel storage function.

The memory 140 may store an application input from the external device interface 135 or the network interface 133 or an application list.

The electronic device 100 may play and provide content file (video file, still image file, music file, document file, application file, etc.) stored in the memory 140 to the user.

The user input interface 150 may transmit a signal input by a user to the controller 170 or may transmit a signal from the controller 170 to the user. For example, the user input interface 150 may receive and process control signal such as power on/off, channel selection, and screen setting from a remote control device 200, or process a control signal from the controller 170 to be transmitted to the remote control device 200 according to various communication methods such as Bluetooth, Ultra Wideband (WB), ZigBee, Radio Frequency (RF) communication, or infrared (IR) communication.

In addition, the user input interface 150 may transfer a control signal input from a local key (not shown) such as a power key, a channel key, a volume key, and a set value to the controller 170.

An image signal processed by the controller 170 may be input to the display 180 and displayed as an image corresponding to the corresponding image signal. In addition, the image signal processed by the controller 170 may be input to an external output device through the external device interface 135.

The audio signal processed by the controller 170 may be output as audio through the speaker 185. Also, the voice signal processed by the controller 170 may be input to an external output device through the external device interface 135.

In addition, the controller 170 may control overall operation within the electronic device 100.

In addition, the controller 170 may control the electronic device 100 according to a user command input through the user input interface 150 or an internal program, access the network, and download an application or application list desired by the user.

The controller 170 allows the channel information selected by the user to be output through the display 180 or the speaker 185 together with the processed video or audio signal.

In addition, the controller 170, according to an external device video playback command received through the user input interface 150, may output a video signal from an external device, for example, a camera or camcorder, input through the external de vice interface 135 or the audio signal through the display 180 or the speaker 185.

Meanwhile, the controller 170 may control the display 180 to display an image, for example, a broadcast image input through the tuner 131, an external input image input through the external device interface 135 or an image input through the network interface unit or an image stored in the memory 140 may be controlled to be displayed on the display 180. In this case, the image displayed on the display 180 may be a still image or a moving image, and may be a 2D image or a 3D image.

In addition, the controller 170 can control content stored in the electronic device 100, received broadcast content, or external input content input from the outside to be reproduced, and the content includes a broadcast video, an external input video, and an audio file, still image, connected web screen, and document file.

The wireless communication interface 173 may perform communication with an external device through wired or wireless communication. The wireless communication interface 173 may perform short-range communication with an external device. To this end, the wireless communication interface 173 may support short-distance communication using at least one of Bluetooth™, Radio Frequency Identification (RFID), Infrared Data Association (IrDA), Ultra Wideband (UWB), ZigBee, Near Field Communication (NFC), Wi-Fi (Wireless-Fidelity), Wi-Fi Direct, and Wireless USB (Wireless Universal Serial Bus) technology. The wireless communication interface 173 may support wireless communication between the electronic device 100 and a wireless communication system, between the electronic device 100 and other electronic devices 100, or between the electronic device 100 and the network where the electronic device 100 (or external server) is located. The local area network may be a local area wireless personal area network (Wireless Personal Area Networks).

Here, the other electronic device 100 is a wearable device capable of exchanging (or interlocking) data with the electronic device 100 according to the present invention (for example, a smartwatch, smart glasses) (smart glass), head mounted display (HMD), and a mobile terminal such as a smart phone. The wireless communication interface 173 may detect (or recognize) a communicable wearable device around the electronic device 100.

Furthermore, if the detected wearable device is a device authorized to communicate with the electronic device 100 according to the present invention, the controller 170 may transmit at least a portion of data processed by the electronic device 100 to the wearable device through the wireless communication interface 173. Accordingly, a user of the wearable device may use data processed by the electronic device 100 through the wearable device.

The display 180 may convert the video signal, data signal, OSD signal processed by the controller 170, or the video signal or data signal received from the external device interface 135 into R, G, and B signals, respectively, to generate driving signal.

Meanwhile, the electronic device 100 shown in FIG. 1 is only one embodiment of the present invention. Some of the illustrated components may be integrated, added, or omitted according to specifications of the electronic device 100 that is actually implemented.

That is, if necessary, two or more components may be combined into one component, or one component may be subdivided into two or more components. In addition, functions performed in each block are for explaining an embodiment of the present invention, and the specific operation or device does not limit the scope of the present invention.

According to another embodiment of the present invention, unlike shown in FIG. 1, the electronic device 100 does not include the tuner 131 and the demodulator 132, but may receive and play video receive and play video the network interface 133 or the external device interface 135.

For example, the electronic device 100 may be separated and be implemented an image processing device such as a set-top box for receiving content according to a broadcast signal or various network services and a content reproducing device that reproduces content input from the image processing device.

In this case, a method of operating an electronic device according to an embodiment of the present invention to be described below may be performed not only the electronic device 100 as described with reference to FIG. 1, but also an image processing device or display 180 such as a set-top box and a content playback device having a speaker 185.

Figure 2:
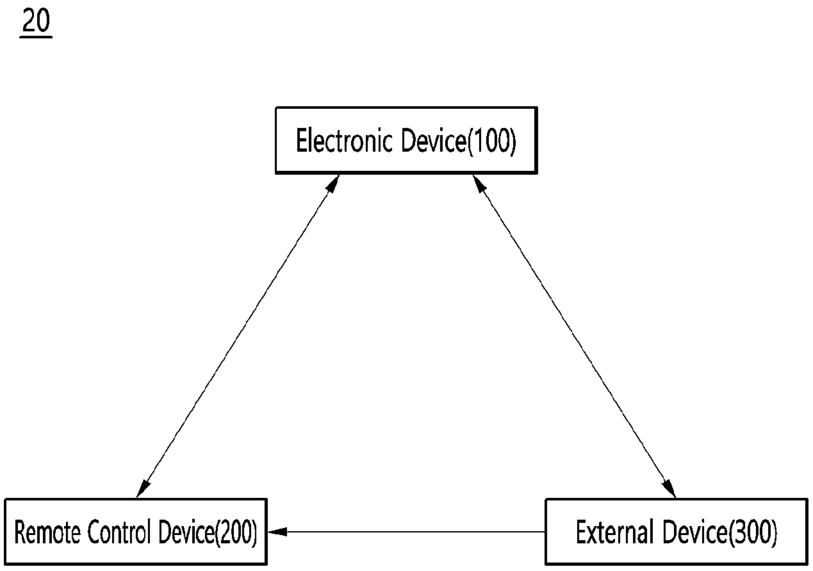
FIG. 2 is a diagram explaining the configuration of an audio output system according to an embodiment of the present disclosure.

FIG. 2 is a diagram explaining the configuration of an audio output system according to an embodiment of the present disclosure.

Referring to FIG. 2, an audio output system 20 may include the electronic device 100, the remote control device 200 and an external device 300.

The electronic device 100 may deliver a sound source to the built-in speaker 185 and output a first audio corresponding to the sound source through the speaker 185.

The electronic device 100 may transmit to the external device 300 the same sound source or a different sound source from the sound source transmitted through the speaker 185.

The remote control device 200 may be a device that remotely controls the electronic device 100.

The remote control device 200 may collect the first audio output through the speaker 185 and the second audio output through the external device 300 through a microphone.

The remote control device 200 may transmit the collected first audio and second audio to the electronic device 100.

Figure 3:
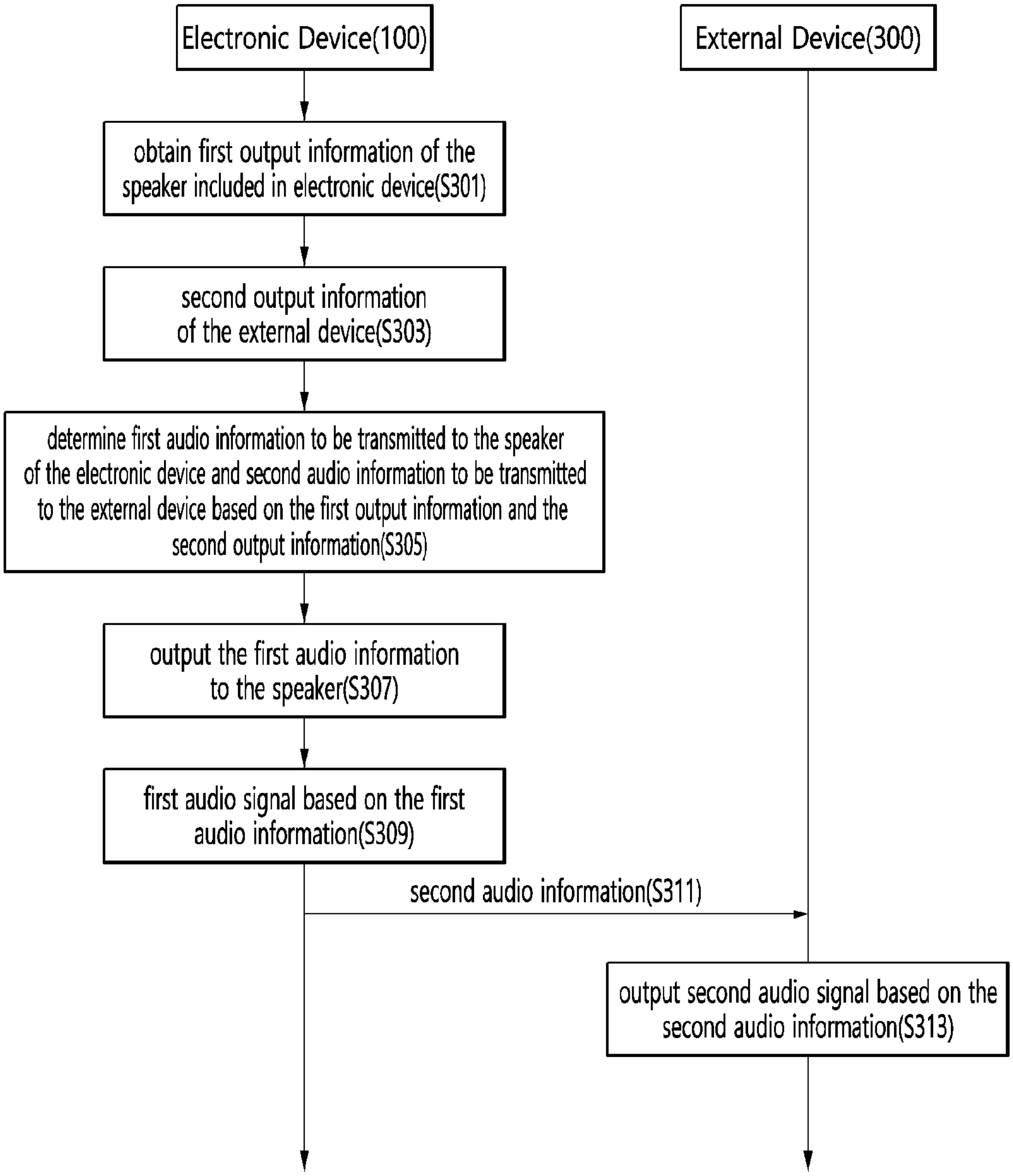
FIG. 3 is a ladder diagram illustrating an operating method of an audio output system according to an embodiment of the present disclosure.

FIG. 3 is a ladder diagram illustrating an operating method of an audio output system according to an embodiment of the present disclosure.

In FIG. 3, it is assumed that the electronic device 100 and the external device 300 are connected to each other through a wired communication standard or a wireless communication standard.

The wireless communication standard may be a Bluetooth standard or a Wi-Fi standard, but this is only an example.

If the wireless communication standard is the Bluetooth standard, each of the wireless communication interface 173 of the electronic device 100 and the external device 300 may include a Bluetooth circuit for Bluetooth communication.

Hereinafter, the speaker 185 of the electronic device 100 may be referred to as an internal speaker, and the speaker of the external device 300 may be referred to as an external speaker.

Referring to FIG. 3, the controller 170 of the electronic device 100 obtains first output information of the speaker 185 (S301).

The speaker 185 may be a component built into the electronic device 100.

In one embodiment, the first output information of the speaker 185 may include one or more of an output power included in the specification information of the speaker 185, an audio channel information of the speaker 185, an actual output power of the audio output by the speaker 185, directivity information of the speaker 185 or an operating frequency range information of the speaker 185.

The controller 170 may store first output information of the speaker 185 in the memory 140.

The controller 170 may transmit the model name of the speaker 185 to an external server through the network interface 133 and receive first output information of the speaker 185 from the external server.

The number of speakers 185 included in the electronic device 100 may be provided in plurality.

The controller 170 of the electronic device 100 obtains second output information of the external device 300 (S303).

In one embodiment, the controller 170 may receive information on the external device 300 from the external device 300 connected wirelessly.

Information on the external device 300 may include specification information of the external device 300. Specifically, the specification information of the external device 300 may include second output information about a speaker included in the external device 300 and identification information (ex, model name) of the speaker.

The second output information may include at least one of an output power or audio channel information of a speaker included in the external device 300, an actual output power, directivity information of audio output from a speaker included in the external device, or operating frequency range information.

When establishing a wireless connection with the external device 300, the controller 170 may receive the second output information from the external device 300.

In another embodiment, the controller 170 may transmit the model name of the speaker included in the external device 300 to the external server through the network interface 133, and transmit the model name of the speaker included in the external device 300 to the external server and receive the second output information from the external server.

In another embodiment, the controller 170 may receive the second output information of the external device 300 from the remote control device 200. The remote control device 200 may receive the second output information of the external device 300 from the external device 300, and may transmit the second output information of the external device 300 to the electronic device 100 according to a request of the electronic device 100.

Meanwhile, the controller 170 may receive the second output information from each of a plurality of external devices having speakers. That is, a plurality of external speakers may be configured.

The controller 170 of the electronic device 100 may determine a first audio information to be transmitted to the speaker 185 of the electronic device 100 and a second audio information to be transmitted to the external device 300 based on the first output information and the second output information (S305).

In an embodiment, the controller 170 may set one of the speaker 185 of the electronic device 100 and the speaker of the external device 300 as the main speaker and set the other as a sub speaker based on the first output information and the second output information.

This will be described with reference to FIG. 4.

Figure 4:
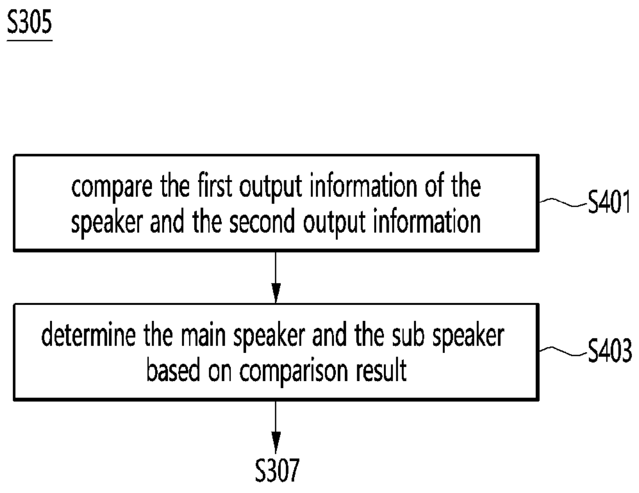
FIG. 4 is a flowchart illustrating a process of setting a main speaker and a sub speaker based on output information according to an embodiment of the present disclosure.

FIG. 4 is a flowchart illustrating a process of setting a main speaker and a sub speaker based on output information according to an embodiment of the present disclosure.

The controller 170 of the electronic device 100 may compare the first output information of the speaker 185 and the second output information of the external device 300 (output information of the speaker provided in the external device) (S401).

Based on a comparison result, the controller 170 of the electronic device 100 may determine one of the speaker 185 and the speaker provided in the external device 300 as the main speaker and the other as the sub speaker (S403).

In one embodiment, the controller 170 may compare the first output power of the speaker 185 and the second output power of the speaker provided in the external device 300, determine a speaker having a greater output power as the main speaker and determine a speaker with a smaller output power as a sub speaker.

The controller 170 may output main audio to the main speaker and surround audio to the sub speaker.

If the main speaker is the speaker 185 of the electronic device 100 and the sub speaker is determined to be the speaker of the external device 300, the controller 170 may transmit the main audio to the speaker 185, and transmit the surround audio to the external device 300.

Conversely, if the main speaker is the speaker of the external device 300 and the sub speaker is the speaker 185 of the electronic device 100, the controller 170 may transmit the main audio to the external device 300, and transmit the surround audio to the speaker 185.

In one embodiment, the main audio may be audio uttered by a person in the content video, and the sub audio (or surround audio) may be background audio, but this is only an example.

Meanwhile, if the speaker of the external device 300 is set as the main speaker, the controller 170 may change the component of audio output from the speaker 185 according to audio channel information of the speaker of the external device 300.

Figure 5:
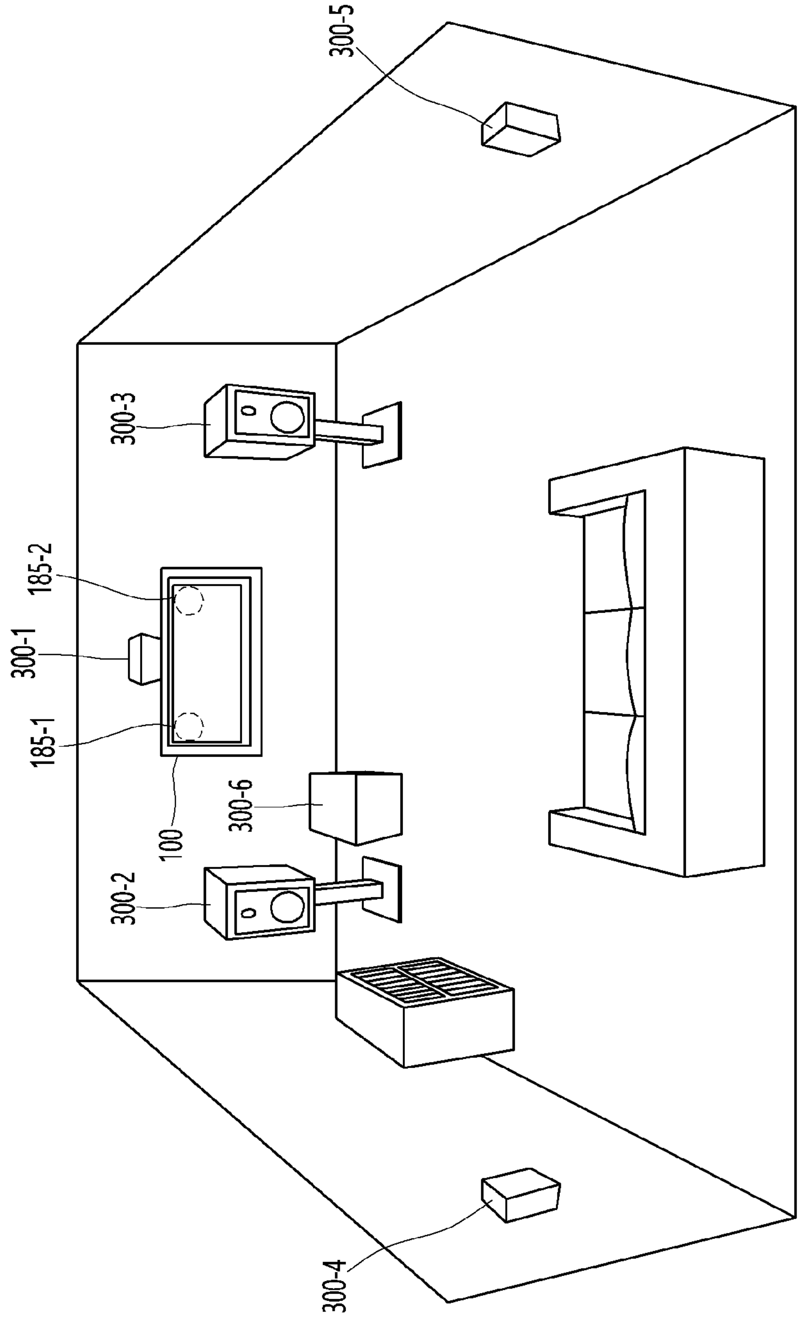
FIG. 5 is a diagram for explaining an example of changing an audio component of a speaker of an electronic device according to audio channel information of an external device set as a main speaker according to an embodiment of the present disclosure.

FIG. 5 is a diagram for explaining an example of changing an audio component of a speaker of an electronic device according to audio channel information of an external device set as a main speaker according to an embodiment of the present disclosure.

Referring to FIG. 5, a 5.1-channel audio system 300-1 to 300-5 and an electronic device 100 are illustrated.

Each speaker provided in the audio systems 300-1 to 300-5 or the audio systems 300-1 to 300-5 may be an external device 300.

The audio system may include a center speaker 300-1, a left speaker 300-2, a right speaker 300-3, a rear left speaker 300-4, and a rear right speaker 300-5.

Assume that the center speaker 300-1 is the external device 300 set as the main speaker and the electronic device 100 receives audio channel information (center of 5.1 channel) of the center speaker 300-1.

The electronic device 100 may control speakers 185-1 and 185-2 such that the internal speakers 185-1 and 185-2 configure two channels for surround back according to the audio channel information of the center speaker 300-1 and output audio.

Accordingly, an effect of configuring a 7.1-channel audio system may appear.

In another embodiment, the controller 170 of the electronic device 100 may determine a main speaker and a sub speaker based on the first audio output from the internal speaker 185 and the second audio output from the speaker of the external device 300.

Figure 6:
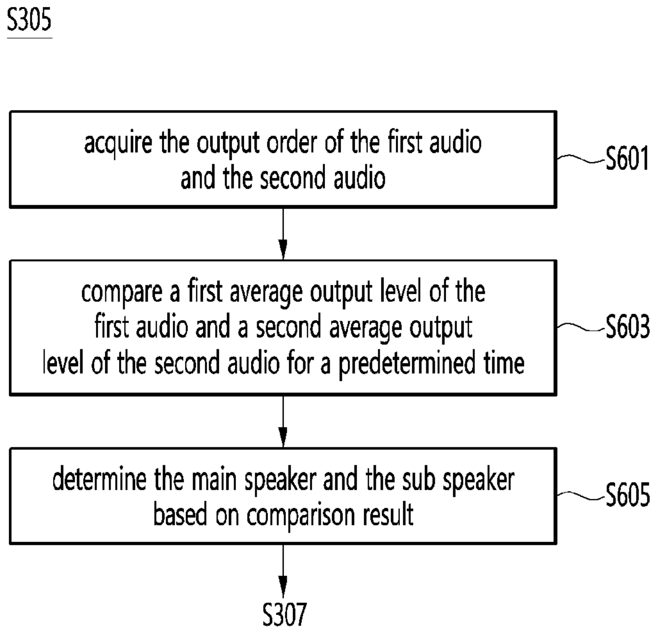
FIG. 6 is a flowchart illustrating a process of determining a main speaker and a sub speaker by comparing first audio output from an internal speaker with second audio output from a speaker of an external device according to an embodiment of the present disclosure.

FIG. 6 is a flowchart illustrating a process of determining a main speaker and a sub speaker by comparing first audio output from an internal speaker with second audio output from a speaker of an external device according to an embodiment of the present disclosure.

Referring to FIG. 6, the controller 170 of the electronic device 100 acquires the output order of the first audio and the second audio (S601).

In one embodiment, the electronic device 100 may include a microphone (not shown) and receive the first audio and the second audio through the microphone.

The microphone may be provided separately from the electronic device 100. In this case, the microphone may be provided in the remote control device 200.

The controller 170 may determine the first audio collected by the microphone first as audio output by the internal speaker 185 and the second audio collected later as the speaker output from the external device 300. This is because audio delivered to the internal speaker 185 may be output earlier than audio delivered to the speaker of the external device 300.

The controller 170 of the electronic device 100 compares a first average output level of the first audio and a second average output level of the second audio for a predetermined time (S603).

The predetermined time may be a period during which each audio is output.

The controller 170 may measure the average power of the first audio output for the predetermined time and obtain the average power as the first average output level.

The controller 170 may measure the average power of the second audio output for the predetermined time and obtain the average power as the second average output level.

The reason for using the average power is to minimize the error.

Based on the comparison result, the controller 170 of the electronic device 100 determines one of the internal speaker 185 and the speaker of the external device 300 as the main speaker and the other as the sub speaker (S605).

The controller 170 may determine a speaker outputting audio having a larger average output level as a main speaker and a speaker outputting audio having a smaller average output level as a sub speaker.

Figure 7A:
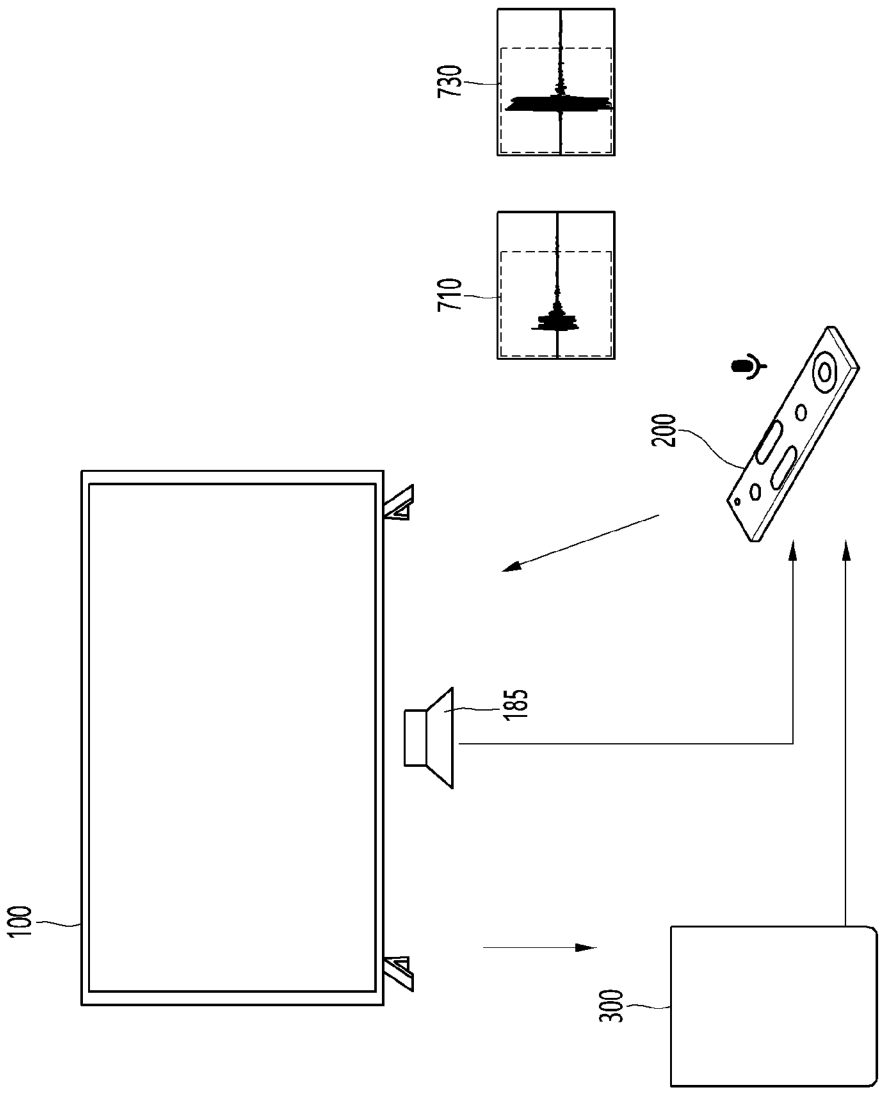
FIGS. 7A and 7B are diagrams illustrating an example of determining a main speaker and a sub speaker according to an average output level of audio.
Figure 7B:
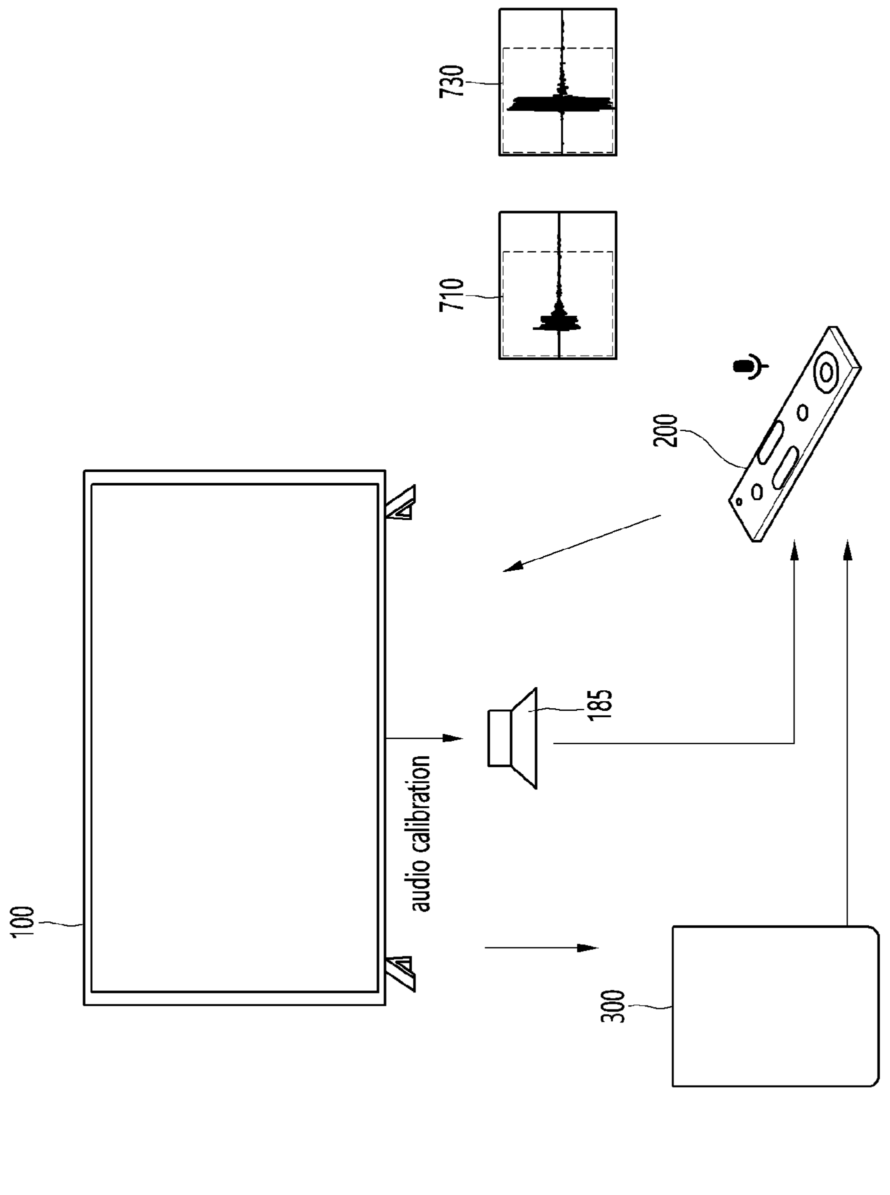

FIGS. 7A and 7B are diagrams illustrating an example of determining a main speaker and a sub speaker according to an average output level of audio.

Referring to FIG. 7A, the electronic device 100 outputs audio through an internal speaker 185 and transmits the same audio to the external device 300. The internal speaker 185 may be provided on one side of the electronic device 100.

The remote control device 200 may collect the first audio 710 output from the internal speaker 185 and the second audio 730 output from the external device 300.

The remote control device 200 transmits the first audio 710 and the second audio 730 to the electronic device 100.

The remote control device 200 may recognize the audio collected first of the two audios as the first audio output from the internal speaker 185, and recognize the audio collected later as the second audio output from the external device 300. The remote control device 200 may transmit the first audio and the second audio together with the recognition result to the electronic device 100.

The electronic device 100 may measure the first average output level of the first audio and the second average output level of the second audio for the predetermined time.

The electronic device 100 may compare the measured first average output level and the measured second average output level, and as a result of the comparison, determine a speaker that outputs lager audio as the main speaker.

The electronic device 100 may transmit the main audio to the speaker determined as the main speaker and transmit the sub audio to the speaker determined as the sub speaker.

Meanwhile, the controller 170 may scale either the first audio or the second audio in the entire process of comparing the average output levels of the first audio and the second audio.

This is because a sound pressure deviation may exist because the distance between the speaker 185 and the remote control device 200 is different from the distance between the external device 300 and the remote control device 200 or the performance of each speaker is different.

Referring to FIG. 7B, the electronic device 100 may acquire a sound pressure deviation value between the internal speaker 185 and the external device 300, and calibrate audio output through the internal speaker 185 based on the sound pressure deviation value.

This is to prevent the case where the sound pressure deviation value is too large.

To this end, the electronic device 100 may acquire the sound pressure deviation value based on the difference between the amplitude of the first audio and the amplitude of the second audio, and scale the first audio if the sound pressure deviation value is greater than or equal to a preset value. Of course, the electronic device 100 may scale the second audio instead of scaling the first audio.

The electronic device 100 may scale the first audio or the second audio so that the sound pressure deviation value is less than a preset value.

Scaling may be a process of increasing or decreasing the overall level of an audio signal.

Before comparing the average output level, the sound between the two speakers can be balanced according to the audio calibration to compensate for the deviation from the external speakers.

This can be applied even if there are a plurality of external speakers.

Again, FIG. 3 is described.

The controller 170 of the electronic device 100 outputs the determined first audio information to the speaker 185 (S307) and outputs a first audio signal based on the first audio information through the speaker 185 (S309).

The first audio information includes a first audio signal output by the speaker 185 of the electronic device 100.

The first audio information may further include one or more of information about a type of the first audio signal transmitted to the speaker 185 of the electronic device 100 or whether the speaker 185 is a main speaker or a sub speaker.

The type of the first audio signal may indicate whether audio delivered to the speaker 185 is main audio or surround audio.

The speaker 185 of the electronic device 100 outputs the first audio signal included in the first audio information.

The controller 170 of the electronic device 100 transmits the determined second audio information to the external device 300 through the wireless communication interface 173 (S311).

The second audio information includes a second audio signal output from a speaker of the external device 300.

The second audio information may further include one or more of information about a type of the second audio signal transmitted to the speaker of the external device 300 or whether the speaker of the external device 300 is a main speaker or a sub speaker.

The type of the second audio signal may indicate whether audio delivered to the speaker of the external device 300 is main audio or surround audio.

The controller 170 may transmit the second audio information to the external device 300 through the Wi-Fi communication standard or the Bluetooth communication standard.

The external device 300 outputs a second audio signal based on the second audio information received from the electronic device 100 (S313).

The external device 300 outputs the second audio signal included in the second audio information.

Figure 8:
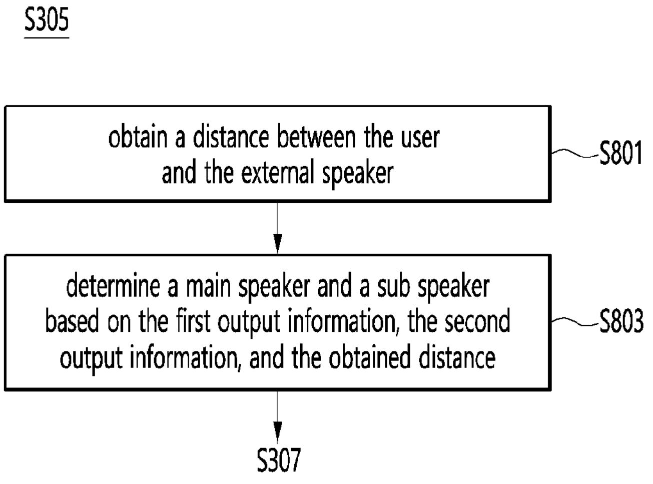
FIG. 8 is a flowchart illustrating a process of determining a main speaker and a sub speaker according to another embodiment of the present disclosure.

FIG. 8 is a flowchart illustrating a process of determining a main speaker and a sub speaker according to another embodiment of the present disclosure.

FIG. 8 is an embodiment embodying step S305 of FIG. 3.

The controller 170 of the electronic device 100 obtains a distance between the user and the external speaker (S801).

The controller 170 may obtain a distance between the user and an external speaker as a distance between the remote control device 200 and the external device 300. This is because the remote control device 200 will normally exist at the user's location.

In one embodiment, the controller 170 may receive the distance between the remote control device 200 and the external device 300 from the remote control device 200. The remote control device 200 may transmit a signal to the external device 300 and measure the distance using a received signal strength indicator (RSSI) value of a received signal received from the external device 300.

In another embodiment, the controller 170 may receive the distance between the remote control device 200 and the external device 300 from the external device 300. The external device 300 may transmit a signal to the remote control device 200 and measure the distance using a received signal strength indicator (RSSI) value of a received signal received from the remote control device 200.

In another embodiment, the controller 170 may measure the distance between the user and the external device 300 using depth information of an image captured by a camera (not shown) provided in the electronic device 100.

The controller 170 determines a main speaker and a sub speaker among the internal speaker 185 and the external speaker based on the first output information, the second output information, and the obtained distance (S803).

In one embodiment, the controller 170 may determine the external speaker as the main speaker if the obtained distance is within a predetermined distance. That is, if the distance between the user and the external speaker is close, the user is more sensitive to sound output through the external speaker.

Here, the predetermined distance may be 1 m, but this is only an example value.

If the first output power of the internal speaker 185 is greater than the second output power of the external speaker and the distance between the user and the external device 300 is within a certain distance, the controller 170 may determine the external speaker as the main speaker and determine the internal the speaker 185 as the sub speaker.

That is, if the distance between the user and the external device 300 is within the certain distance, the controller 170 may determine the external speaker as the main speaker and determine the internal speaker 185 as the sub speaker even if the first output power of the internal speaker 185 is greater than the second output power of the external speaker.

As described above, according to an embodiment of the present disclosure, since the main speaker is determined in consideration of the output power of each of the internal and external speakers and the position between the user and the external speaker, sound more suitable for the user's situation can be provided.

Figure 9:
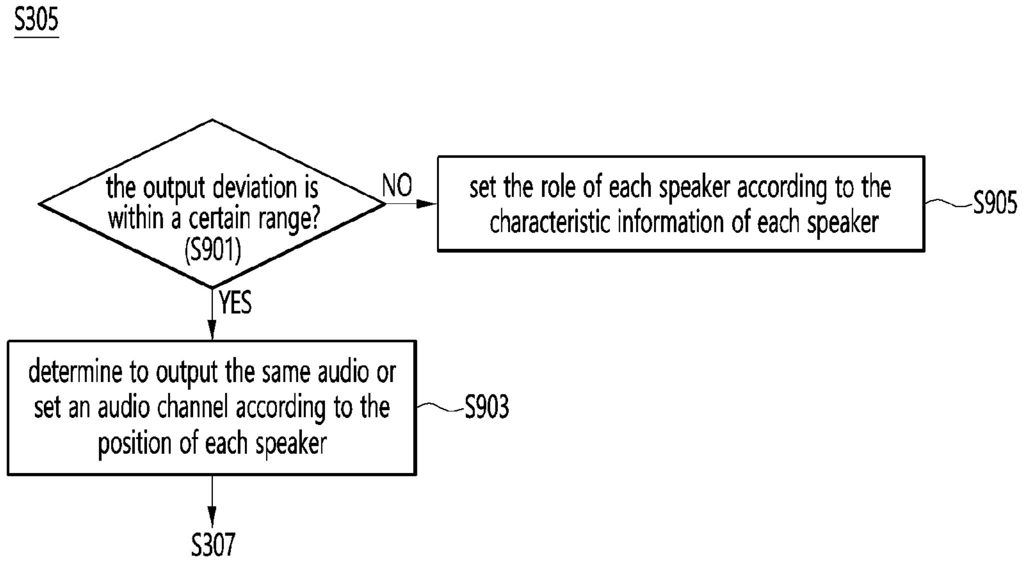
FIG. 9 is a flowchart illustrating a process of performing speaker setting based on an output difference between a first audio output from an internal speaker and a second audio output from an external speaker.

FIG. 9 is a flowchart illustrating a process of performing speaker setting based on an output difference between first audio output from an internal speaker and second audio output from an external speaker.

FIG. 9 may be an embodiment in which step S305 of FIG. 3 is embodied.

Referring to FIG. 9, the controller 170 of the electronic device 100 determines whether the output deviation is within a certain range based on the first output information of the internal speaker 185 and the second output information of the external speaker (S901).

In one embodiment, as in the embodiment of FIG. 7A, the controller 170 may determine that the output deviation is within a certain range if the difference between the first average output level of the first audio output from the internal speaker 185 and the second average output level of the second audio output from the external speaker is less than a preset level difference.

If the output deviation is within a certain range, the controller 170 may determine to output the same audio from the internal speaker 185 and the external speaker, or set an audio channel according to the position of each speaker (S903).

In an embodiment, if it is determined that the output deviation is within a certain range, the controller 170 may determine to output the same type of audio from the internal speaker 185 and the external speaker, respectively.

That is, if the controller 170 determines that the output deviation is within a certain range, the controller 170 may operate the internal speaker 185 and the external speaker in a mono mode.

The same type may be either a main audio type or a surround audio type.

In another embodiment, if it is determined that the output deviation is within the certain range, the controller 170 may set an audio channel according to the position of each of the internal speaker 185 and the external speaker.

For example, if the internal speaker 185 is located on the right side of the external speaker, the controller 170 may set the internal speaker 185 as a right channel speaker and set the external speaker as a left channel speaker.

That is, if the output deviation is within the certain range and the internal speaker 185 is located on the right side compared to the external speaker, the controller 170 may operate the two speakers in a stereo mode.

Accordingly, the internal speaker 185 may output audio generated from the right side of the image, and the external speaker may output audio generated from the left side of the image.

If the output deviation is not within the certain range, the controller 170 may set the role of each speaker according to the characteristic information of each speaker (S905).

The characteristic information of each speaker may include one or more of directivity information of the speaker or operating frequency range information.

The directivity information may include information about in which direction the speaker transmits audio.

Operating frequency range information may include a frequency range of audio output from a speaker.

The first output information may further include one or more of directivity information or operating frequency range information of the internal speaker 185, and the second output information may further include directivity information or operating frequency range information of the external speaker.

In one embodiment, if the output deviation is not within the certain range and only the external speaker has the directivity information, the controller 170 may set the external speaker as a directional speaker and set the internal speaker 185 as a non-directivity speaker.

A non-directivity speaker is a speaker that distributes audio uniformly to the surrounding space.

In another embodiment, if the output deviation is not within the certain range and the operating frequency ranges of the internal speaker 185 and the external speaker are different, the controller 170 may set a role of the internal speaker 185 and the external speaker according to the operating frequency range.

For example, the controller 170 may set the internal speaker 185 as a base speaker if the operating frequency range of the internal speaker 185 is 20 Hz to 500 Hz, and set as a tweeter speaker if the operating frequency range of the external speaker is between 2 kHz and 20 kHz.

The controller 170 may transmit audio suitable for an operating frequency range of each speaker.

As such, according to an embodiment of the present disclosure, if the output deviation of each speaker is not within the certain range, an audio system capable of outputting optimal sound by assigning a role according to the characteristic of each speaker can be provided.

Meanwhile, in another embodiment, the controller 170 may output a notification if the output deviation is not within the certain range and the characteristic of the external speaker is not suitable for configuring the audio system.

Figure 10:
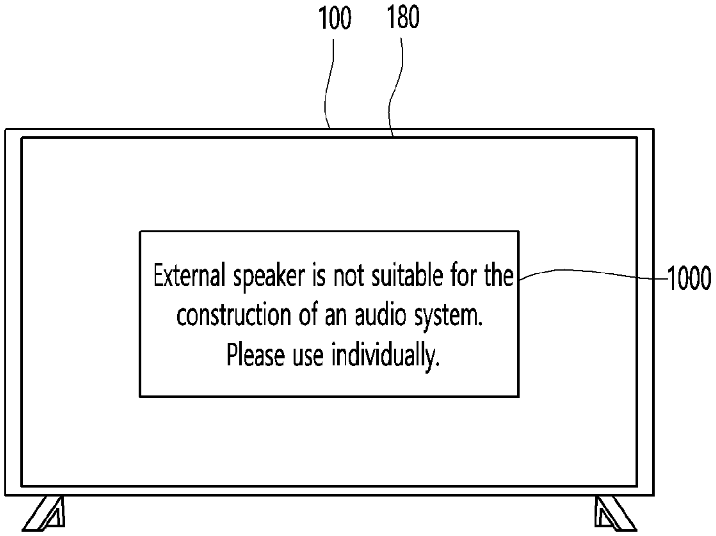
FIG. 10 is a diagram for explaining an output notification if the characteristic of an external speaker is not suitable for configuring an audio system according to an embodiment of the present disclosure.

FIG. 10 is a diagram for explaining an output notification if the characteristic of an external speaker is not suitable for configuring an audio system according to an embodiment of the present disclosure.

If the output deviation of the audio output from each of the internal speaker 185 and the external speaker is not within the certain range and the characteristic of the external speaker is not suitable for configuring the audio system, the controller 170 may display a notification 1000 for guiding the individual use on the display 180.

For example, the case in which characteristic of an external speaker is not suitable for constructing an audio system may be a case in which the operating frequency range of the external speaker is out of range of a base, a tweeter, or an up-firing, respectively.

Figure 11A:
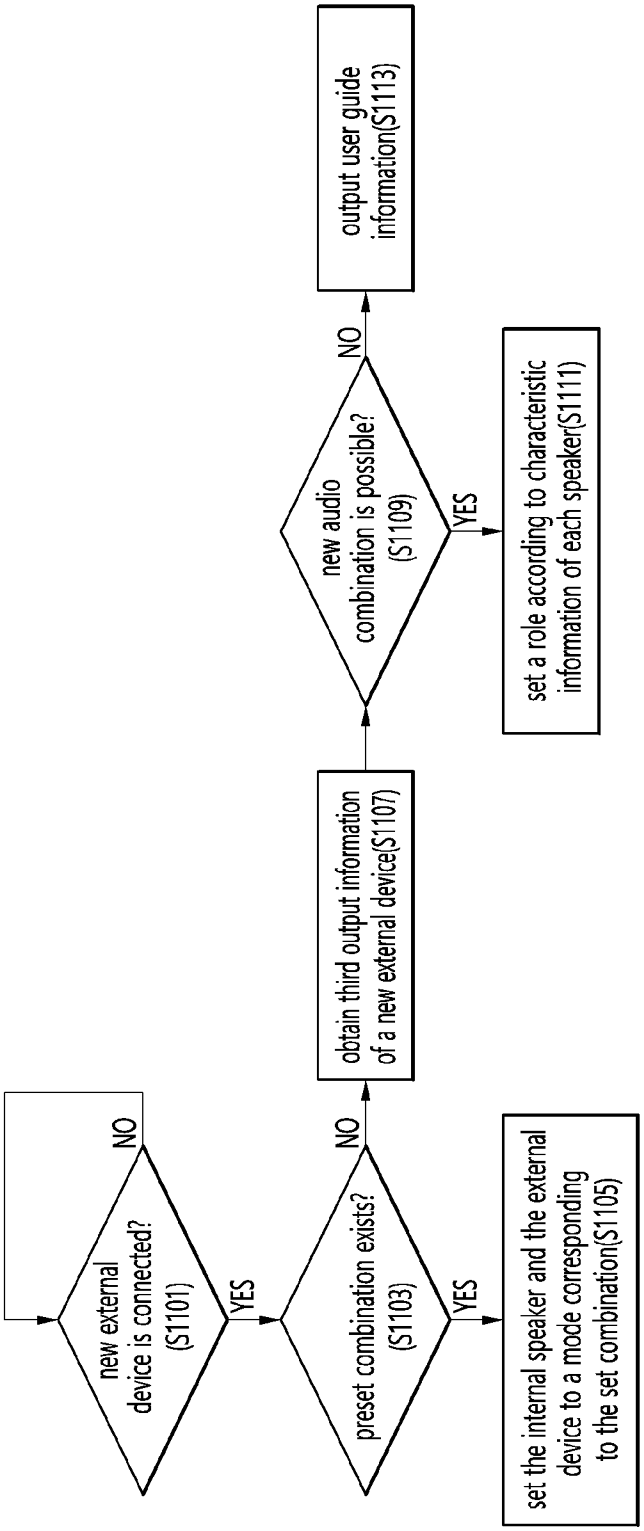
FIG. 11A is a flowchart illustrating an operation according to the connection of a new external device to an electronic device.

FIG. 11A is a flowchart illustrating an operation according to the connection of a new external device to an electronic device.

FIG. 11A may be an embodiment occurring after the embodiment of FIG. 3.

Referring to FIG. 11A, the controller 170 of the electronic device 100 determines whether an external device is connected (S1101).

The external device may be a device previously has been connected to the electronic device 100 or a new device previously not connected to the electronic device 100.

If an external device is connected, the controller 170 may determine whether a preset combination with the connected external device exists (S1103).

The memory 140 may store audio combination between the electronic device 100 and previously connected external device.

The audio combination may include identification information of the external device, role information of the internal speaker 185 of the electronic device 100, and role information of the external speaker included in the external device.

The role information may include one or more of a role according to whether the speaker is the main speaker or the sub speaker, sound channel information of the speaker, directivity information of the speaker, or a role according to the operating frequency range of the speaker.

If it is determined that a previously set combination exists with the connected external device, the controller 170 may set the internal speaker 185 and the external device to a mode corresponding to the set combination (S1105).

If a preset combination between an external device connected to the electronic device 100 and the electronic device 100 is stored in the memory 140, the controller 170 may set the role of the internal speaker 185 and the external device according to the stored combination.

For example, in a combination where the role of the internal speaker 185 is the main speaker and the role of an external device is the sub speaker, the controller 170 may transmit the main audio to the internal speaker 185 and the surround audio to the external device.

As described above, according to an embodiment of the present disclosure, if an external device connected to the electronic device 100 is previously connected, an audio system may be set automatically and quickly using a stored audio combination.

The controller 170 may obtain third output information of a new external device if it is determined that there is no previously set combination with the connected external device (S1107).

The third output information may include one or more of output power or audio channel information, directivity information, or operating frequency range information of a speaker provided in the new external device.

Also, the controller 170 may receive location information of a new external device about the location of the electronic device 100 from the new external device.

The controller 170 may determine whether a new audio combination is possible based on the first output information of the internal speaker 185 and the third output information of the new external device (S1109).

The controller 170 may determine that a new combination is possible if the acoustic performance of the entire audio system is supplemented by adding a connection of the new external device.

In one embodiment, the controller 170 may determine that the new audio combination is possible if the operating frequency range of the internal speaker 185 is different from that of the external device.

If it is determined that the new audio combination is possible, the controller 170 may set a role according to characteristic information of each speaker (S1111).

Speaker characteristic information may include one or more of directivity information and operating frequency range information of the speaker.

The directivity information may include information about in which direction the speaker transmits audio.

Operating frequency range information may include a frequency range of audio output from a speaker.

In an embodiment, if only the speaker of the new external device has directivity information, the controller 170 may set the speaker of the external device as a directivity speaker and set the internal speaker 185 as a non-directivity speaker.

In another embodiment, if the operating frequency ranges of the internal speaker 185 and the speaker of the external device are different from each other, the controller 170 may set roles of the internal speaker 185 and the speaker of the external device according to the operating frequency range.

For example, the controller 170 may set the internal speaker 185 as a base speaker if the operating frequency range of the internal speaker 185 is 20 Hz to 500 Hz, and set the speaker of the external device as a tweeter speaker if the operating frequency range of the speaker of the external device is between 2 kHz and 20 KHz.

Meanwhile, if it is determined that a new audio combination is possible, the controller 170 may display a notification on the display 180 indicating that a new external device can be additionally connected to the audio system.

If it is determined that a new audio combination is impossible, the controller 170 may output user guide information (S1113).

According to an embodiment, the user guide information may include a guide for setting a new role of a speaker of an external device in relation to the electronic device 100.

Figure 11B:
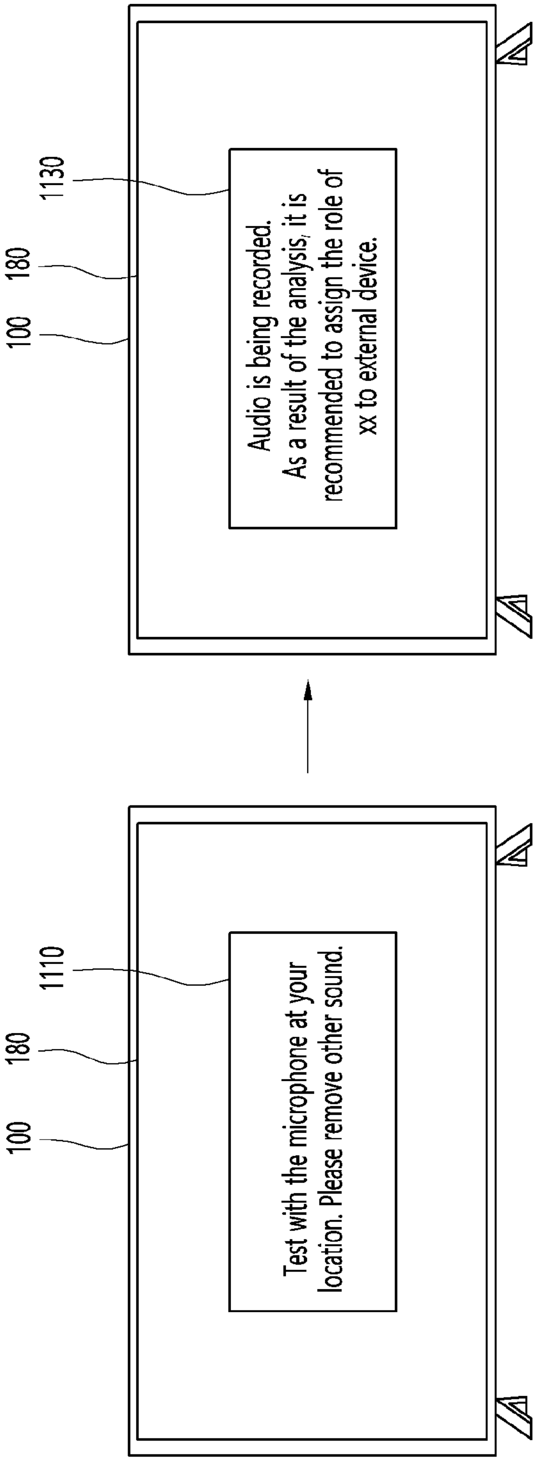
FIG. 11B is a diagram for explaining user guide information according to an embodiment of the present disclosure.

FIG. 11B is a diagram for explaining user guide information according to an embodiment of the present disclosure.

The electronic device 100 may display a first user guide information 1110 on the display 180 if it is determined that audio combination with a new connected external device is impossible.

For example, the first user guide information 1110 may include text for guiding recording of audio output from a new external device.

If audio output from a new external device is recorded through a microphone, the electronic device 100 may display a second user guide information 1130 recommending a role of the external device on the display 180 based on the recorded audio.

As described above, according to an embodiment of the present disclosure, the electronic device 100 may assign a specific role to the external device or provide a guide for assigning a role of the external device to the user while continuously monitoring additional connectable external device.

Figure 12:
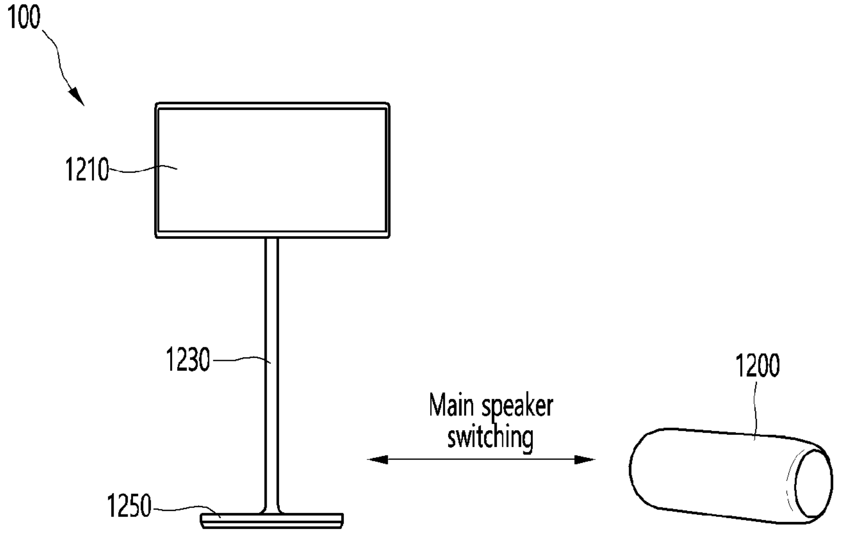
FIG. 12 is a diagram for explaining an example of changing a main speaker according to an embodiment of the present disclosure.

FIG. 12 is a diagram for explaining an example of changing a main speaker according to an embodiment of the present disclosure.

The electronic device 100 is a stand type display device and includes all of the components of FIG. 1.

The external speaker 1200 is an example of the external device 300 of FIG. 3.

The electronic device 100 may include a display 1210, a shaft 1230 and a stand base 1250.

The shaft 1230 may connect the display 1210 and the stand base 1250. Shaft 1230 may extend vertically.

A lower end of the shaft 1230 may be connected to an edge portion of the stand base 1250.

A lower end of the shaft 1230 may be rotatably connected to the circumference of the stand base 1250.

The display 1210 and shaft 1230 may rotate about a vertical axis relative to the stand base 1250.

An upper portion of the shaft 1230 may be connected to a rear surface of the display 1210.

The stand base 105 may serve to support the display 1210.

The display 1210 may be configured to include a shaft 1230 and a stand base 1250.

The display device 1210 may rotate about a point where the top of the shaft 1230 and the rear surface of the display 1210 come into contact.

The display device 1210 may include an internal speaker (not shown).

If the output power included in the specification information of the internal speaker is greater than the output power included in the specification information of the external speaker 1200, the electronic device 100 may determine the internal speaker as the main speaker and the external speaker as the sub speaker.

Then, if actual measured output power of the audio output from the internal speaker is smaller than the output power of the audio output from the external speaker 1200, the electronic device 100 may switch the main speaker to the external speaker 1200 and the sub speaker to the internal speaker 185.

As described above, according to an embodiment of the present disclosure, if the output power according to the specification information of each speaker differs from the actually measured output power, the optimal sound can be provided by changing the main speaker according to the situation.

In another embodiment, the electronic device 100 may transmit the surround audio and a part of the main audio to external speaker if the output power included in the specification information of the external speaker 1200 is greater than the output power included in the specification information of the internal speaker, even if the internal speaker is determined as the main speaker and the external speaker 1200 is determined as the sub speaker.

This is to maximize the use of the output performance of the external speaker 1200.

Figure 13:
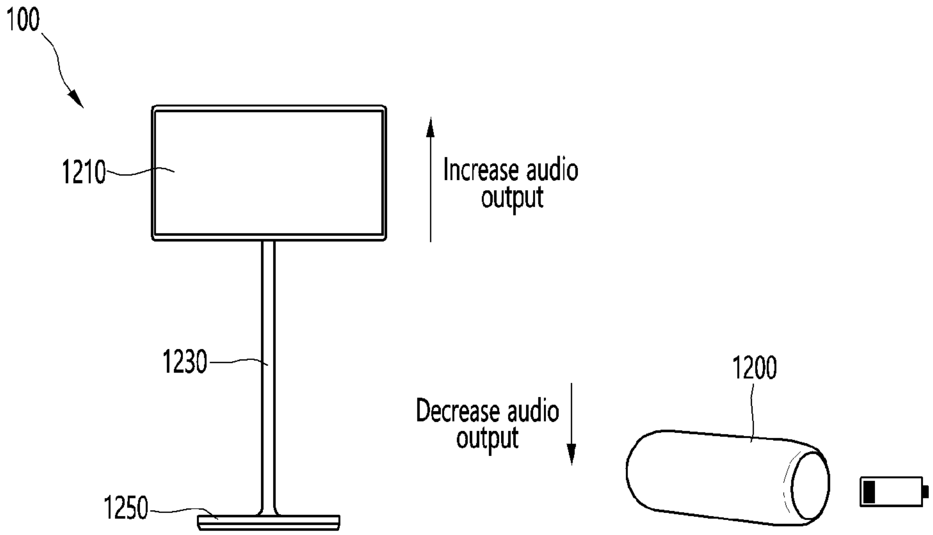
FIG. 13 is a diagram for explaining an example of enhancing the output of a speaker of an electronic device based on the amount of power of an external speaker.

FIG. 13 is a diagram for explaining an example of enhancing the output of a speaker of an electronic device based on the amount of power of an external speaker.

In FIG. 13, the electronic device 100 and the external speaker 1200 borrow the example of FIG. 12.

Also, it is assumed that the internal speaker and the external speaker 1200 of the electronic device 100 output the same audio.

The external speaker 1200 may gradually reduce audio output power if the amount of remaining power is less than a certain amount of power.

The electronic device 100 receives information about the amount of power of the external speaker 1200 from the external speaker 1200, and if the amount of power of the external speaker 1200 is less than the certain amount of power, the electronic device 100 gradually may increase the audio output power of the internal speaker.

Accordingly, the acoustic performance of the audio system can be maintained as much as possible.

The electronic device 100 may determine a main speaker based on the type of content consumed by the electronic device 100.

For example, if a movie image is being displayed on the display 1210 of the electronic device 100, an internal speaker of the electronic device 100 may be determined as a main speaker.

Accordingly, the internal speaker of the electronic device 100 may output main audio (audio spoken by a person), and the external speaker 1200 may output surround audio (background music).

According to an embodiment of the present disclosure, the above-described method can be implemented as a processor-readable code in a medium on which a program is recorded. Examples of media readable by the processor include ROM, RAM, CD-ROM, magnetic tape, floppy disk, optical data storage, and the like.

The electronic device described above is not limited to the configuration and method of the above-described embodiments, but the above embodiments may be configured by selectively combining all or part of each embodiment so that various modifications can be made.

What is claimed:

1. An electronic device comprising:
- a speaker;
- a wireless communication interface configured to communicate with an external speaker; and
- a controller configured to:
- acquire a first output information of the speaker and a second output information of the external speaker;
- based on the first output information and the second output information, output a first audio signal to the speaker and transmit a second audio signal to the external speaker through the wireless communication interface; and
- based on a first average output level of a first audio output from the speaker for a predetermined time and a second average output level of a second audio output from the external speaker for the predetermined time, set a role according to characteristic information of each of the speaker and the external speaker.

2. The electronic device of claim 1, wherein the controller is further configured to:
- based on the first output information and the second output information, determine a main speaker to output main audio and a sub speaker to output surround audio from among the speaker and the external speaker.

3. The electronic device of claim 2, wherein the controller is further configured to determine the speaker as being the main speaker and the external speaker as being the sub speaker based on an output power value of the speaker included in the first output information being greater than an output power value of the external speaker included in the second output information.

4. The electronic device of claim 2, wherein the controller is further configured to:
- control the first audio output from the speaker according to audio channel information of the external speaker included in the second output information based on the external speaker being determined as being the main speaker and the speaker being determined as being the sub speaker.

5. The electronic device of claim 2, wherein the controller is further configured to:
- based on an output power included in specification information of the speaker being greater than an output power included in specification information of the external speaker, determine the speaker as being the main speaker and the external speaker as being the sub speaker; and
- switch the speaker to being the sub speaker and the external speaker to being the main speaker based on an output power of audio output from the speaker being smaller than an output power of audio output from the external speaker.

6. The electronic device of claim 2, wherein the controller is further configured to:
- based on the speaker being determined as being the main speaker and the external speaker being determined as being the sub speaker, and an output power included in specification information of the external speaker being greater than an output power included in specification information of the speaker, transmit a part of the main audio to the external speaker additionally.

7. The electronic device of claim 1, wherein the controller is further configured to:
- transmit identification information of the external speaker to an external server and receive the second output information from the external server; or
- receive the second output information from the external speaker.

8. The electronic device of claim 1, wherein the controller is further configured to:
- determine a main speaker to output main audio and a sub speaker to output surround audio from among the speaker and the external speaker based on the first average output level and the second average output level.

9. The electronic device of claim 1, wherein the controller is further configured to:
- obtain a distance between a user and the external speaker; and
- determine a main speaker to output main audio and a sub speaker to output surround audio from among the speaker and the external speaker based on the first output information, the second output information, and the distance.

10. The electronic device of claim 1, wherein the controller is further configured to:

based on the first average output level and the second average output level, transmit a same audio signal to the speaker and the external speaker or set an audio channel of each of the speaker and the external speaker.

11. The electronic device of claim 1, wherein the controller is further configured to set the external speaker as a directivity speaker and set the speaker as a non-directivity speaker based on only the characteristic information of the external speaker having directivity information.

12. The electronic device of claim 1, wherein the characteristic information includes an operating frequency range, and wherein the controller is further configured to set each of the speaker and the external speaker as one of a base speaker, a tweeter speaker, or an up-firing speaker according to the corresponding operating frequency range.

13. The electronic device of claim 1, wherein the controller is further configured to:

based on a new external device being connected, determine whether a pre-stored audio combination exists between the new external device and the electronic device; and based on determining that the pre-stored audio combination exists, set the role of the speaker and a role of the new external device as a stored audio combination.

14. The electronic device of claim 13, wherein the controller is further configured to:

obtain third output information of the new external device based on determining that the pre-stored audio combination does not exist; and based on determining that a new audio combination is possible based on the third output information, output a notification indicating that the new external device can be additionally connected.

15. The electronic device of claim 14, wherein the controller is further configured to set the role based on the characteristic information of the speaker and characteristic information of the new external device based on determining that the new audio combination is possible.

16. The electronic device of claim 14, wherein the controller is further configured to recommend a role of the new external device based on determining that the new audio combination is impossible.

17. The electronic device of claim 1, wherein the controller is further configured to:

receive the first audio output from the speaker and the second audio output from the external speaker from a remote control device for controlling operation of the electronic device.

18. The electronic device of claim 1, wherein each of the speaker and the external speaker is configured in plurality.

19. A method of operating an electronic device comprising a speaker, the method comprising:

acquiring a first output information of the speaker and a second output information of an external speaker;

based on the first output information and the second output information, outputting a first audio signal to the speaker and transmitting a second audio signal to the external speaker; and based on a first average output level of a first audio output from the speaker for a predetermined time and a second average output level of a second audio output from the external speaker for the predetermined time, setting a role according to characteristic information of each of the speaker and the external speaker.

20. An electronic device comprising:

a speaker;

a wireless communication interface configured to communicate with an external speaker; and a controller configured to:

acquire a first output information of the speaker and a second output information of the external speaker;

based on the first output information and the second output information, output a first audio signal to the speaker and transmit a second audio signal to the external speaker through the wireless communication interface; and determine a main speaker to output main audio and a sub speaker to output surround audio from among the speaker and the external speaker based on a first average output level of a first audio output from the speaker for a predetermined time and a second average output level of a second audio output from the external speaker for the predetermined time.

* * * * *